(12) United States Patent
Li

(10) Patent No.: US 8,588,992 B2
(45) Date of Patent: Nov. 19, 2013

(54) HYBRID CONTROLLING AND DRIVING CIRCUIT AND METHOD THEREOF

(75) Inventor: Wuhua Li, Hangzhou (CN)

(73) Assignee: Silergy Semiconductor Technology (Hangzhou) Ltd, Hangzhou (CN)

( * ) Notice: Subject to any disclaimer, the term of this patent is extended or adjusted under 35 U.S.C. 154(b) by 334 days.

(21) Appl. No.: 12/932,686

(22) Filed: Mar. 3, 2011

(65) Prior Publication Data
US 2011/0218692 A1    Sep. 8, 2011

(30) Foreign Application Priority Data

Mar. 5, 2010    (CN) .......................... 2010 1 0118443

(51) Int. Cl.
G05D 25/00    (2006.01)

(52) U.S. Cl.
USPC ........... 700/297; 700/288; 700/291; 700/295; 700/276; 700/287

(58) Field of Classification Search
None
See application file for complete search history.

(56) References Cited

U.S. PATENT DOCUMENTS

| | | | | |
|---|---|---|---|---|
| 5,706,187 A | * | 1/1998 | Nakamura | 363/55 |
| 5,779,817 A | * | 7/1998 | Wecker | 136/244 |
| 5,923,100 A | * | 7/1999 | Lukens et al. | 307/66 |
| 5,929,538 A | * | 7/1999 | O'Sullivan et al. | 307/66 |
| 6,476,315 B2 | * | 11/2002 | Ganz | 136/244 |
| 6,628,011 B2 | * | 9/2003 | Droppo et al. | 307/43 |
| 6,650,560 B2 | * | 11/2003 | MacDonald et al. | 363/142 |
| 6,713,890 B2 | * | 3/2004 | Kondo et al. | 290/40 B |
| 7,177,168 B2 | * | 2/2007 | Toyomura et al. | 363/131 |
| 7,301,247 B2 | * | 11/2007 | Kishibata et al. | 307/44 |
| 7,411,308 B2 | * | 8/2008 | Parmley | 290/1 R |
| 7,449,798 B2 | * | 11/2008 | Suzuki et al. | 307/65 |
| 7,469,541 B1 | * | 12/2008 | Melton et al. | 60/641.1 |
| 7,781,913 B2 | * | 8/2010 | Wang | 307/64 |
| 7,839,018 B2 | * | 11/2010 | Chen et al. | 307/46 |
| 8,093,756 B2 | * | 1/2012 | Porter et al. | 307/72 |
| 2004/0183982 A1 | * | 9/2004 | Bruno et al. | 349/143 |
| 2006/0058897 A1 | * | 3/2006 | Senda et al. | 700/22 |
| 2006/0202559 A1 | * | 9/2006 | Hashimoto et al. | 307/64 |

(Continued)

FOREIGN PATENT DOCUMENTS

CN        101447677 A    6/2009

OTHER PUBLICATIONS

Tseng, S. -Y; Kuo, J.-S.; Wang, S.-W.; Hsieh, C. -T, "Buck-Boost Combined with Active Clamp Flyback Converter for PV Power System," Power Electronics Specialists Conference, 2007. PESC 2007. IEEE, pp. 138-144, Jun. 17-21, 2007.*

*Primary Examiner* — Kavita Padmanabhan
*Assistant Examiner* — Christopher E Everett
(74) *Attorney, Agent, or Firm* — Michael C. Stephens, Jr.

(57) ABSTRACT

Methods, circuits, apparatus, and systems related to a hybrid driving and controlling circuit are disclosed. In one embodiment, a hybrid driving and controlling circuit in a double power supply system includes first and second power supplies and at least one load, and the circuit can include: (i) a controller coupled to a hybrid switcher that enables energy transfer from the first and second power supplies; (ii) when a determined energy of the first power supply is sufficient, the controller can control the hybrid switcher to transfer energy from the first power supply to the second power supply; and (iii) when the determined energy of the first power supply is insufficient, the controller can control the hybrid switcher to transfer energy from the second power supply to the at least one load.

16 Claims, 5 Drawing Sheets

(56) References Cited

U.S. PATENT DOCUMENTS

| | | |
|---|---|---|
| 2008/0197709 A1* | 8/2008 | Wakitani et al. ............... 307/84 |
| 2010/0038965 A1* | 2/2010 | Rohner et al. ................. 307/66 |
| 2010/0138062 A1* | 6/2010 | Zheng et al. ................. 700/291 |
| 2010/0198421 A1* | 8/2010 | Fahimi et al. ................ 700/291 |
| 2010/0207452 A1* | 8/2010 | Saab ............................ 307/65 |
| 2011/0006607 A1* | 1/2011 | Kwon et al. ................... 307/66 |
| 2011/0245986 A1* | 10/2011 | Campanile et al. ........... 700/288 |

* cited by examiner

HYBRID CONTROLLING AND DRIVING CIRCUIT AND METHOD THEREOF

RELATED APPLICATIONS

This application claims the benefit of Chinese Patent Application No. CN201010118443.2, filed on Mar. 5, 2010, which is incorporated herein by reference in its entirety.

FIELD OF THE INVENTION

The present invention relates generally to power supplies, and more specifically to a hybrid driving and controlling circuit for a double power supply system.

BACKGROUND

In a conventional double power supply system, a first power supply, which can be any type of solar cell, fuel cell, wind power generator, or power grid, can receive external energy for conversion to energy that is stored within the first power supply. A second power supply can be power supply that can store energy, such as battery. When energy stored in the first power supply is sufficient, the first power supply may transfer energy to the second power supply and to the load. However, when the energy of the first power supply is insufficient, the second power supply may transfer energy to the load for driving separately.

Thus, conventional approaches transfer energy to the load from either the first power supply or the second power supply. However, disadvantages of this approach include increased circuit complexity and/or lower reliability, possibly resulting in failure to meet requirement of current applications.

SUMMARY

Embodiments of the present invention relate to methods of operating, as well as circuits, structures, devices, and/or applications for to a hybrid driving and controlling circuit.

In one embodiment, a hybrid driving and controlling circuit in a double power supply system includes first and second power supplies and at least one load, and the circuit can include: (i) a controller coupled to a hybrid switcher that enables energy transfer from the first and second power supplies; (ii) when a determined energy of the first power supply is sufficient, the controller can control the hybrid switcher to transfer energy from the first power supply to the second power supply; and (iii) when the determined energy of the first power supply is insufficient, the controller can control the hybrid switcher to transfer energy from the second power supply to the at least one load.

In another embodiment, a hybrid driving and controlling method for a double power supply system with first and second power supplies, at least one load, and a controller, can include: (i) sensing, by the controller, status information for the first power supply and the second power supply, where the status information includes an indication of energy stored in the first power supply; (ii) controlling, by a hybrid switcher, the first power supply to transfer energy to the second power supply if the stored energy in the first power supply is determined to be sufficient; and (iii) controlling, by the hybrid switcher, the second power supply to transfer energy to the at least one load if the stored energy in the first power supply is determined to be insufficient.

In another embodiment, a double power supply system, can include: (i) a first power supply; (ii) a second power supply; (iii) at least one load that receives energy from at least one of the first power supply and the second power supply; (iv) a hybrid driving and controlling circuit coupled to the first power supply, the second power supply, and the at least one load, where the hybrid driving and controlling circuit includes a hybrid switcher coupled to a controller; (v) when energy stored in the first power supply is determined to be sufficient, the controller can control the hybrid switcher to transfer energy from the first power supply to the second power supply; and (vi) when energy stored in the first power supply is determined to be insufficient, the controller can control the hybrid switcher to transfer energy from the second power supply to the at least one load.

Embodiments of the present invention can advantageously provide an efficient double power supply system with fewer components and a simplified structure to achieve overall simplified circuit design with less interference between components to improve reliability and stability at a lower cost. In addition, power loss may be reduced to achieve higher conversion efficiency. These and other advantages of the present invention will become readily apparent from the detailed description of preferred embodiments below.

DETAILED DESCRIPTION

Figure 1:
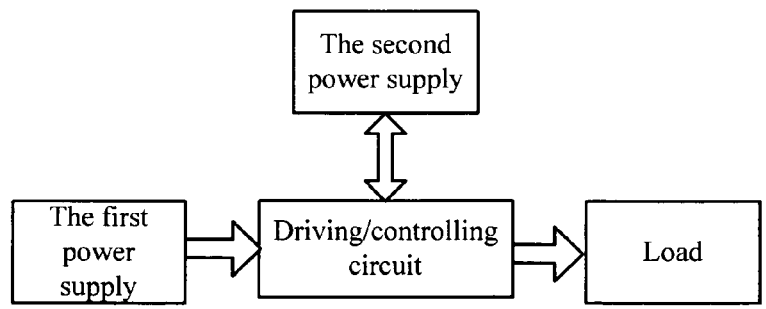
FIG. 1 is a block schematic diagram showing an example double power supply system.

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention.

However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device and/or memory. These descriptions and representations are generally used by those skilled in the data processing arts to effectively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Furthermore, in the context of this application, the terms "wire," "wiring," "line," "signal," "conductor," and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Embodiments of the present invention can advantageously provide an efficient double power supply system with fewer components and a simplified structure to achieve overall simplified circuit design with less interference between components to improve reliability and stability at a lower cost. In addition, power loss may be reduced to achieve higher conversion efficiency. The invention, in its various aspects, will be explained in greater detail below with regard to exemplary embodiments.

Figure 2:
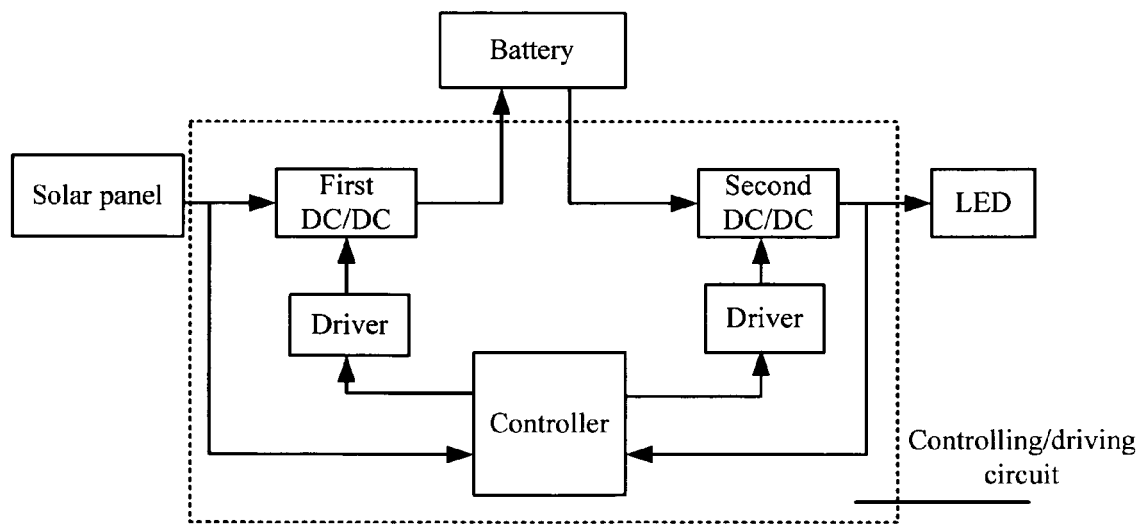
FIG. 2 is a block schematic diagram showing an example driving and controlling circuit for an example double power supply system.

FIGS. 1 and 2 show example double power supply systems. In the example shown in FIG. 1, at least two DC-DC converters may be necessary to carry out a transfer of energy from both power supplies to the load. In the example shown in FIG. 2, the first power supply may be arranged as a solar panel, the second power supply may be a battery, and the load is a light emitting diode (LED). In the daytime or during sunlight, the solar panel can charge the battery through the first DC-DC converter. The first DC-DC converter may thus be employed as a battery charging circuit connected in parallel with the battery.

In the evening or when sunlight is not available, the battery can supply energy to the LED through the second DC-DC converter. The second DC-DC converter may thus be employed as the LED driving circuit. Both operations of charging the battery from the solar panel and supply for the LED through the battery may be controlled by an internal controller. The two DC-DC converters may require many transistors, thus having a disadvantage of increased circuit complexity and higher costs. Further, only one DC-DC converter is busy while the other converter may be idle in during operation of the double power supply system. As such, utilization of the components may not be efficient.

Figure 3:
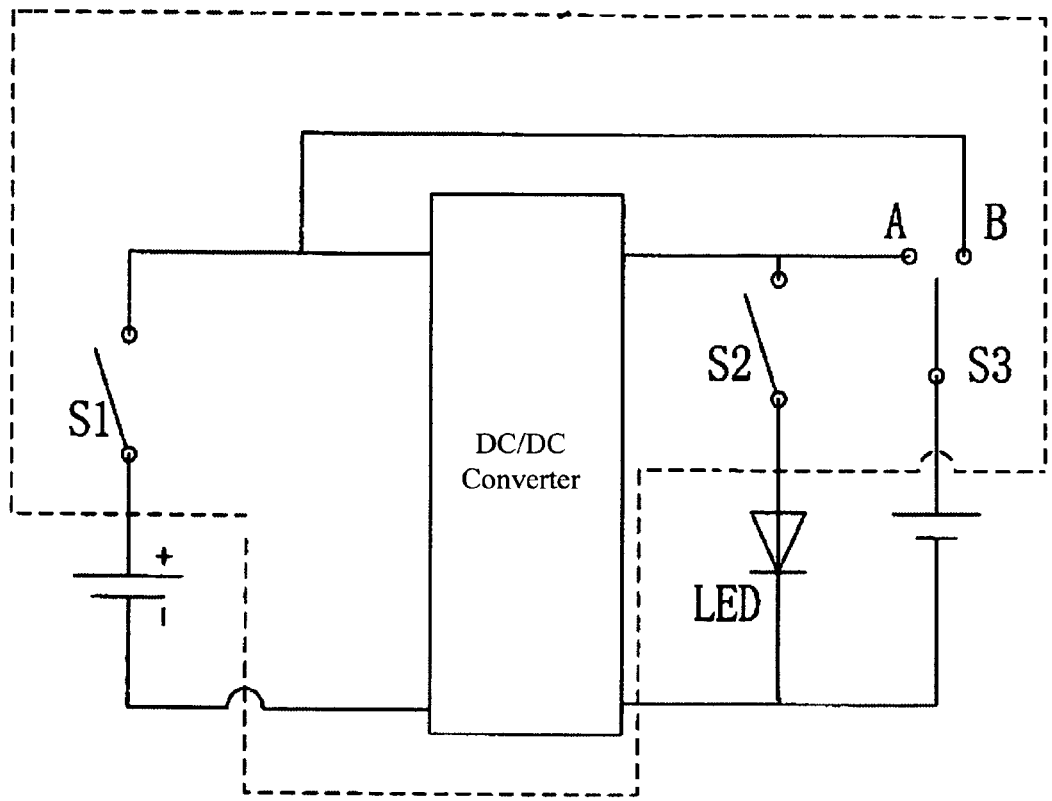
FIG. 3 is a block schematic diagram showing an example multiplex driving and controlling circuit for another example double supply system.

FIG. 3 shows a multiplex DC-DC converter structure. Various control schemes may be utilized for such a multiplex DC-DC converter structure (see, e.g., Chinese patent application CN200910051229.7, entitled "A solar LED driving circuit using a multiplex DC-DC converter"). In this fashion, one complete DC-DC converter is employed, and a switch is supplemented to enable the DC-DC converter to connect to the battery charging circuit or the LED driving circuit in different intervals to support both battery charging and LED driving. However, due to intrinsically limited life, lower reliability, and poor stability of the switch, the control scheme as shown in FIG. 3 may not meet operational requirements of current applications.

In particular embodiments, circuits, systems, and methods of a hybrid controlling and driving circuit can result in simplified circuit design, lower costs, and improved stability.

In one embodiment, a hybrid driving and controlling circuit in a double power supply system includes first and second power supplies and at least one load, and the circuit can include: (i) a controller coupled to a hybrid switcher that enables energy transfer from the first and second power supplies; (ii) when a determined energy of the first power supply is sufficient, the controller can control the hybrid switcher to transfer energy from the first power supply to the second power supply; and (iii) when the determined energy of the first power supply is insufficient, the controller can control the hybrid switcher to transfer energy from the second power supply to the at least one load.

For example, when the determined energy of the first power supply is sufficient, the hybrid switcher may operate in a buck converter mode. Further, when the determined energy of the first power supply is insufficient, the hybrid switcher may operate in a fly back converter mode. Also for example, a first power switch, a second power switch and an inductive component may be shared in both the buck and fly-back mode of the hybrid switcher. Further, the first power supply, the second power supply, the first power switch, and the inductive component may be coupled in series to form a loop, while the second power switch may be coupled in parallel with the first power supply.

Moreover, the hybrid switcher can further include a blocking diode with its cathode electrically connected to the first power supply, and its anode electrically connected to the first power switch. Furthermore, the hybrid switcher may further include an output diode coupled in series with the inductive component and an output capacitor connected in parallel with the load. The hybrid switcher can also include a clamp capacitor with one end connected between the blocking diode and the first power switch, and the other end connected to the common negative terminal of both the first power supply and the second power supply. Also for example, the first power switch and the second power switch can include metal oxide semiconductor field-effect transistors (MOSFET) transistors.

In another embodiment, a hybrid driving and controlling method for a double power supply system with first and second power supplies, at least one load, and a controller, can include: (i) sensing, by the controller, status information for the first power supply and the second power supply, where the status information includes an indication of energy stored in the first power supply; (ii) controlling, by a hybrid switcher, the first power supply to transfer energy to the second power supply if the stored energy in the first power supply is determined to be sufficient; and (iii) controlling, by the hybrid switcher, the second power supply to transfer energy to the at least one load if the stored energy in the first power supply is determined to be insufficient.

For example, the hybrid switcher can include a first power switch, a second power switch, and an inductive component. Further, the first power supply, the second power supply, the first power switch, and the inductive component may be coupled in series to form a loop, and the second power switch may be coupled in parallel with the first power supply.

In another embodiment, a double power supply system, can include: (i) a first power supply; (ii) a second power supply; (iii) at least one load that receives energy from at least one of the first power supply and the second power supply; (iv) a hybrid driving and controlling circuit coupled to the first power supply, the second power supply, and the at least one load, where the hybrid driving and controlling circuit includes a hybrid switcher coupled to a controller; (v) when energy stored in the first power supply is determined to be sufficient, the controller can control the hybrid switcher to transfer energy from the first power supply to the second power supply; and (vi) when energy stored in the first power supply is determined to be insufficient, the controller can control the hybrid switcher to transfer energy from the second power supply to the at least one load.

For example, the first power supply can be any suitable apparatus to convert natural energy to electrical energy (e.g., a solar panel), and the second power supply can be any suitable apparatus to store energy (e.g., a battery, a storage capacitor, etc.).

In particular embodiments, only one hybrid driving and controlling circuit is employed to implement both the charging of the second power supply from the first power supply, and the driving of or supply for the load through the second power supply.

Figure 4:
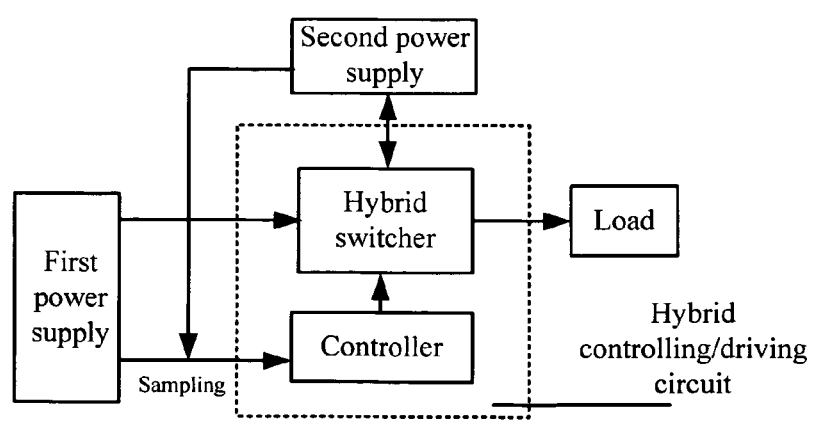
FIG. 4 is a block schematic diagram showing an example double power supply system in accordance with embodiments of the present invention.

Referring now to FIG. 4, a hybrid controlling and driving circuit in a double power supply system and in accordance with embodiments of the present invention is shown. The double power supply system can include a first power supply, a second power supply, and at least one load. The hybrid driving and controlling circuit can include a controller and a hybrid switcher that may be connected in series.

During operation, if the energy of the first power supply is sufficient (e.g., greater than a predetermined amount of energy), the controller can control the hybrid switcher as a buck converter such that the first power supply transfers energy to the second power supply. However, if the energy of the first power supply is insufficient (e.g., less than a predetermined amount of energy), the controller can control the hybrid switcher as a fly back converter such that the second power supply can transfer energy to the load.

The controller can detect a status of the first power supply and the second power supply in order to determine whether the energy stored in the first power supply is sufficient. If so, the controller can switch the operational mode of the hybrid switcher to operate as a buck converter. Various suitable approaches for determining whether the energy of the first power supply and the second power supply are "sufficient." For example, if the first power supply is a solar panel, and an output voltage of the first power supply is higher than an output voltage of the second power supply for a predetermined value, the energy of the first power supply may be determined as sufficient. Further, if an output voltage of the second power supply is substantially constant, the energy of the second power supply made be determined as sufficient.

For example, the first power supply may be a solar panel, the second power supply may be a battery, the load may be an LED, and the power switches can include MOSFET transistors. Various corresponding examples of a hybrid driving and controlling circuit for a double power supply system in accordance with embodiments of the present invention will be described.

Figure 5A:
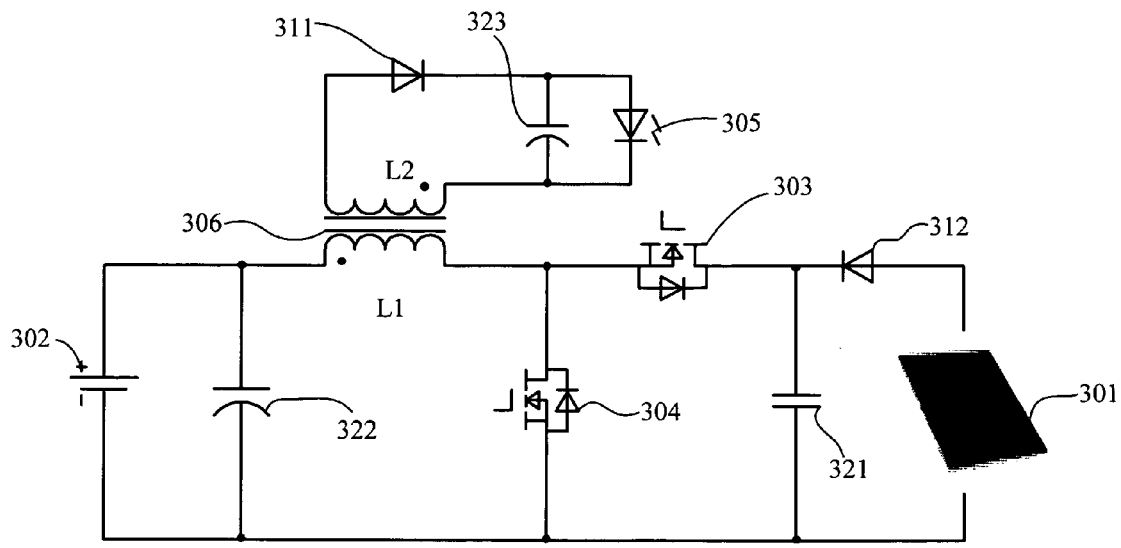
FIG. 5A is a block schematic diagram showing a first example hybrid switcher of a double power supply system in accordance with embodiments of the present invention.

Referring now to FIG. 5A, shown is a first example of a hybrid switcher used in a hybrid driving and controlling circuit for a double power supply system in accordance with embodiments of the present invention. The hybrid switcher can include first power switch 303, second power switch 304, coupled or mutual inductor 306 with primary side winding L1 and secondary side winding L2, and a storage capacitor 322 to form a power stage module for controlling energy to transfer from solar panel 301 to battery 302. The hybrid switcher can also include output diode 311 and output capacitor 323 together with the power stage for controlling energy transfer from battery 302 to LED 305.

The anode of blocking diode 312 can connect to a positive terminal of solar panel 301. The cathode of blocking diode 312 can connect to the drain of first power switch 303 and one end of clamped capacitor 321. The source of first power switch 303 can connect to both the drain of second power switch 304 and one end of the primary side winding L1 of coupled inductor 306. The other end of the primary side winding L1 can connect to both the positive terminal of battery 302 and one end of storage capacitor 322.

The anode of output diode 311 can connect to one end of the secondary side winding L2 of coupled inductor 306. The cathode of output diode 311 can connect to the positive terminal of LED 305. The other end of the secondary side winding L2 of the coupled inductor 306 can connect to the negative terminal of the LED 305. Output capacitor 323 may be coupled in parallel with LED 305. The negative terminal of solar panel 301, the other end of clamped capacitor 321, the source of second power switch 304, and the other end of storage capacitor 322 can connect to the negative terminal of battery 302.

Figure 5B:
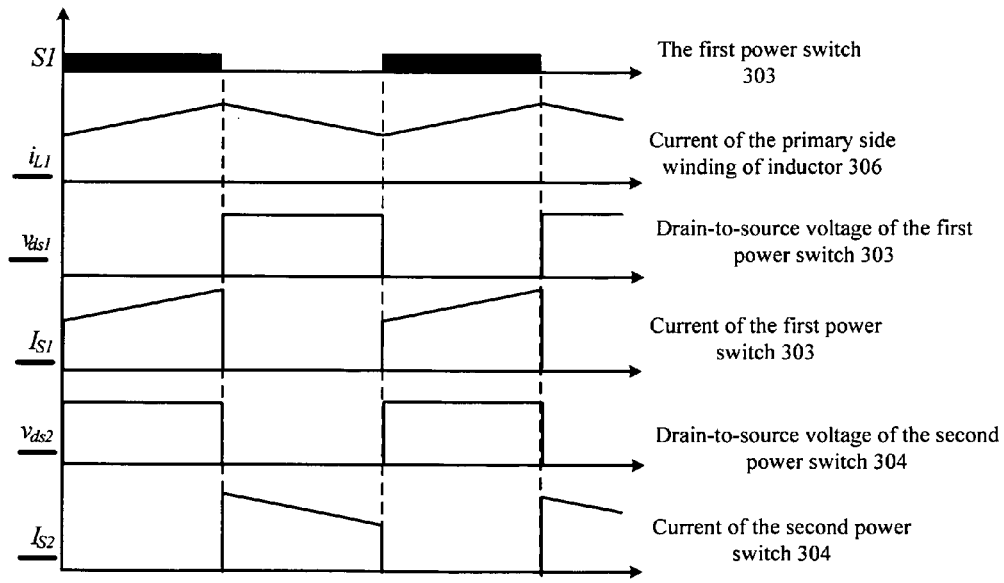
FIG. 5B shows example operational waveforms for the hybrid switcher when the solar panel is charging a battery as shown in FIG. 5A.
Figure 5C:
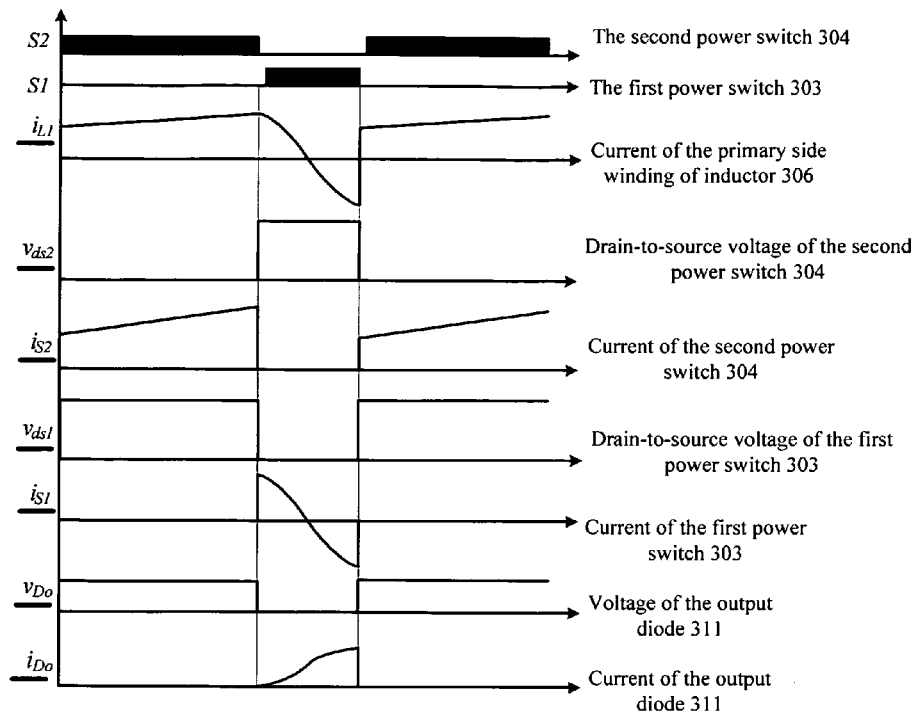
FIG. 5C shows example operational waveforms for the hybrid switcher when the battery is discharging to drive an LED as shown in FIG. 5A.

In FIG. 5B and FIG. 5C, example operation waveforms of the hybrid switcher are shown, where the symbol $I_{S1}$ indicates an example current of first power switch 303, $V_{ds1}$ indicates example drain-to-source voltage of first power switch 303, $I_{S2}$ indicates example current of second power switch 304, $V_{ds2}$ indicates example drain-source voltage of the second power switch 304, $V_{DO}$ indicates example voltage of output diode 311, $I_{DO}$ indicates example current through output diode 311, and $i_{L1}$ indicates example current of the primary side winding L1 of coupled inductor 306.

In the daytime or when sunlight is available, because the solar energy is generally sufficient, the hybrid driving and controlling circuit may be operable in a buck converter mode for controlling solar panel 301 to charge battery 302, and associated example waveforms for this case are shown in FIG. 5B. Blocking diode 312 may be on during the interval because the voltage of solar panel 301 is likely higher than the voltage of battery 302. The controller can control first power switch 303 to be turned on, and the magnetic inductance current of the primary side winding L1 of coupled inductor 306 may remain on and increasing based on the combined control of both solar panel 301 and battery 302. In this fashion, particular embodiments can control the charging for battery 302.

In further operation, the controller can control first power switch 303 to be turned off, but the parasitic diode of the second power switch 304 may be turned on due to the continuity of the output current. When the gate of first power switch 303 is driven, the hybrid switcher may operate as a synchronous rectifier. The magnetic inductance current of the primary side winding L1 of coupled inductor 306 may decrease linearly under the effect of battery 302. Further, output diode 311 may be turned off and LED 305 may not function during the interval for charging battery 302.

In the evening or when sunlight is not available, solar panel 301 may not work. Battery 302 can discharge to drive LED 305. During the interval, blocking diode 312 can be turned off to prevent battery 302 from transferring energy to solar panel 301. In this fashion, the hybrid switcher may operate as an active clamp fly-back converter.

The process of the fly-back converting mode can be divided into two parts: (i) the exchange from turning off second power switch 304 to turning on first power switch 303; and (ii) the exchange from turning off first power switch 303 to turning on second power switch 304, as shown in the example of FIG. 5C. The exchange from turning off second power switch 304 to turning on first power switch 303 may work as discussed below.

Initially, second power switch 304 may be on, first power switch 303 may be off, and blocking diode 312 may be off. When second power switch 304 turns off, the parasitic diode of first power switch 303 may turn on, and the voltage of first power switch 303 can be about zero. The energy of the leakage inductance of coupled inductor 306 can be transferred to clamp capacitor 321. Meanwhile, the gate of first power switch 303 may be driven after the parasitic diode of which is turned on. Then, output diode 311 may turn on, and the energy of coupled inductor 306 may begin to be transferred to LED 305 to enter another steady status whereby second power switch 304 is off and first power switch 303 is on.

An example exchange from turning off first power switch 303 to turning on second power switch 304 can function as discussed below. Before first power switch 303 turns off, the leakage inductance of coupled inductor 306 and output capacitor 323 may be working resonantly. When first power switch 303 turns off, under the effect of the energy of coupled inductor 306, the parasitic diode of second power switch 304 may turn on and the gate of second power switch 304 may be driven. Then, the current of output diode 311 may decrease from a given value to substantially zero with a constant slope to enter another steady status whereby second power switch 304 is on and first power switch 303 is off.

Figure 6:
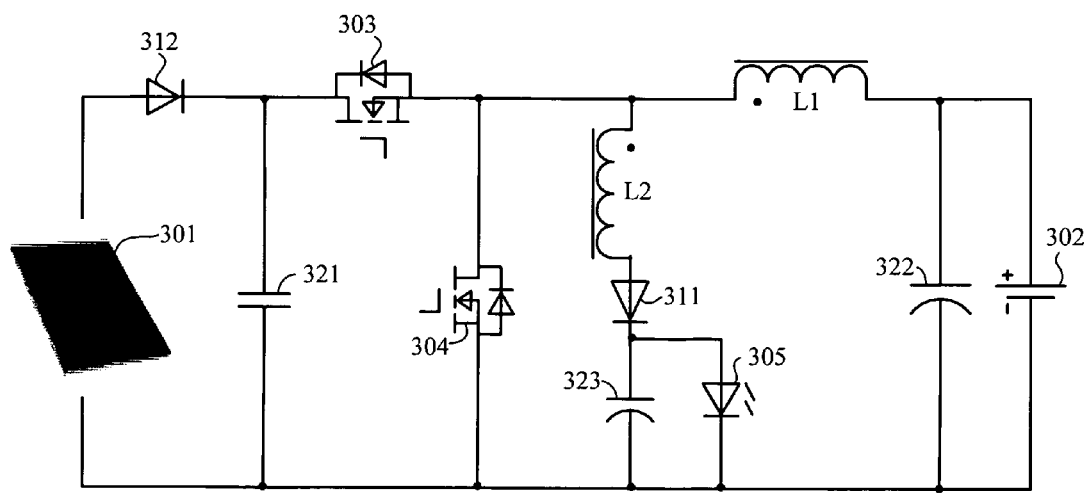
FIG. 6 is a block schematic diagram of a second example hybrid switcher of the double power supply system in accordance with embodiments of the present invention.

Referring now to FIG. 6, another example hybrid driving and controlling circuit in accordance with embodiments of the present invention is shown. The configuration and detailed working process in FIG. 6 maybe similar to that discussed above with reference to FIG. 5A.

Figure 7:
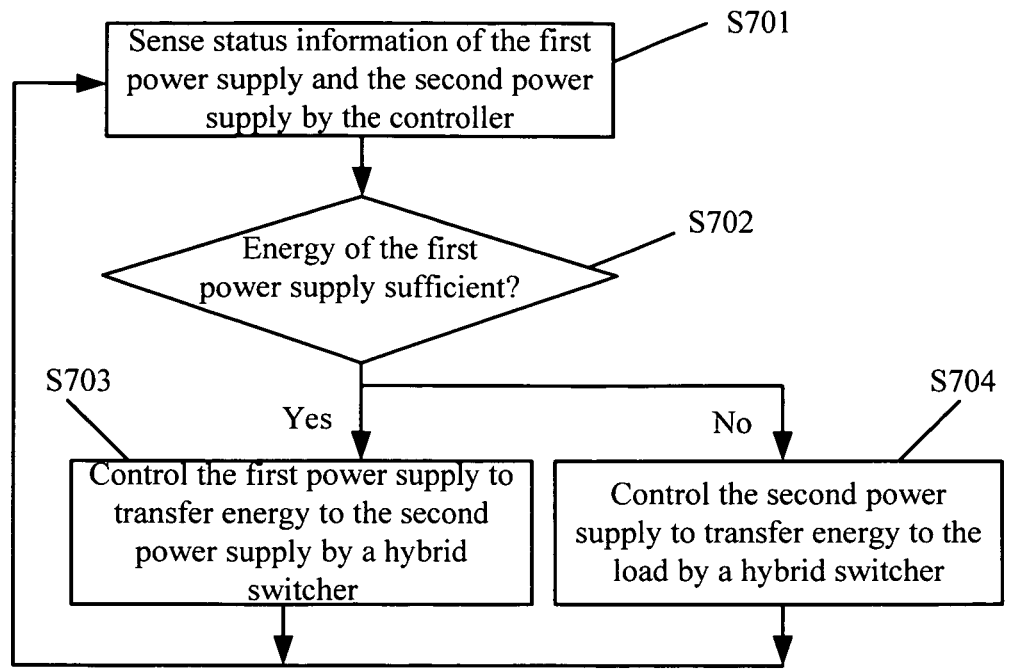
FIG. 7 is a flow diagram of an example driving and controlling method for a double power supply in accordance with embodiments of the present invention.

Referring now to FIG. 7, flow diagram of an example hybrid driving and controlling method for a double power supply system in accordance with embodiments of the present invention is shown. For example, the double power supply system can include a first power supply, a second power supply, and a load.

In S701, status information of the first and second power supplies can be sensed by a controller. In S702, a determination can be made based on the sensed status information as to whether the energy of the first power supply is sufficient. In S703, the first power supply can be controlled by a hybrid switcher to transfer energy to the second power if the energy of the first power supply is determined that sufficient. In this case, for example, the controller can control the hybrid switcher in a buck converter mode to transfer energy from the first power supply to the second power supply.

In S704, the second power supply can be controlled by the hybrid switcher to transfer energy to the load if the energy stored in the first power supply is determined as insufficient. In this case, for example, the controller can control the hybrid switcher in a fly back converter mode in order to transfer energy from the second power supply to the load.

For example, the hybrid switcher can include a first power switch, a second power switch, and an inductive component. Also, the first power supply, the second power supply, the first power switch, and the inductive component can be coupled in series to form a loop, and the second power switch can be coupled in parallel with the first power supply.

Figure 8:
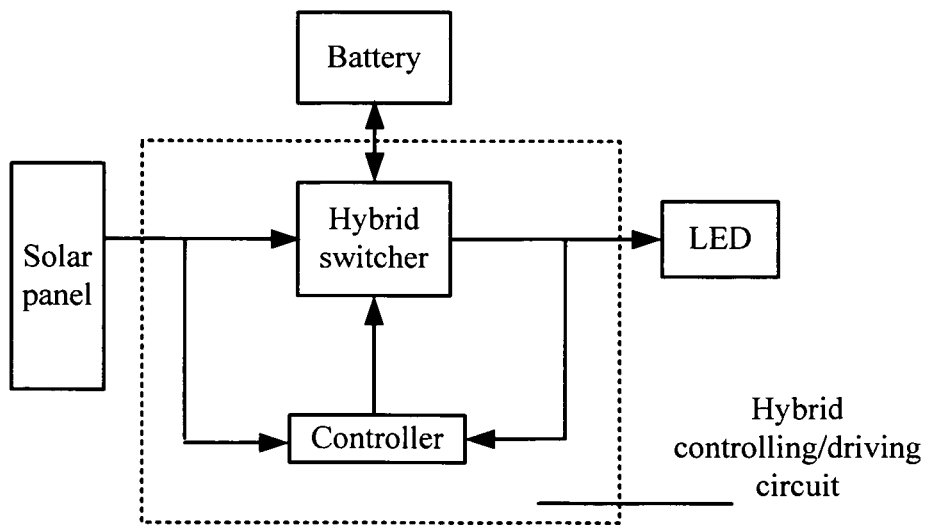
FIG. 8 shows an example double power supply system in accordance with embodiments of the present invention.

Referring now to FIG. 8, an example double power supply system in accordance with embodiments of the present invention is shown. The example double power supply system can include: a first power supply (e.g., solar panel), a second power supply (e.g., battery), and at least one load (e.g., LED) to receive the energy from the first power supply and/or the second power supply. The example double power supply system can further include a hybrid driving and controlling circuit coupled to the first power supply, the second power supply, and the load.

The hybrid driving and controlling circuit may include a hybrid switcher and a controller that are electrically coupled together. If the energy stored in the first power supply is determined as sufficient, the first power supply may be controlled by the hybrid switcher to transfer energy to the second power supply. However, if the energy stored in the first power supply is determined as insufficient, the second power supply may be controlled by the hybrid switcher to transfer energy to the load. For example, the first power supply can be any suitable apparatus that converts natural energy to electrical energy, and the second power supply can be any suitable apparatus that stores energy.

While the above examples include circuit and method implementations of a hybrid controlling and driving circuit for a double power supply, one skilled in the art will recognize that other technologies and/or structures can be used in accordance with embodiments. Further, one skilled in the art will recognize that other device circuit arrangements, elements, and the like, may also be used in accordance with embodiments. For example, the conversion mode of the hybrid switcher can be any suitable type of topology (e.g., boost, buck-boost topology, etc.). Further, an suitable type of regulator topology, such as step-up, step-down, step-up/step-down, flyback, forward topology, etc., of converter, including switching devices and filters, can be employed as the power supply and/or a poser stage in particular embodiments.

Additional aspects and advantages of particular embodiments will become readily apparent to those skilled in the art from the detailed description herein, where only exemplary embodiments are shown and described. As will be realized, the present invention is capable of other and different embodiments, and its several details are capable of modifications in various respects, all without departing from the invention. Accordingly, the drawings and description are to be regarded as illustrative in nature, and not as restrictive.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A hybrid driving and controlling circuit in a power supply system having first and second power supplies and at least one load, the circuit comprising:
   a) a controller coupled to a hybrid switcher that enables energy transfer from said first and second power supplies, wherein said first and second power supplies are connected at a common node, wherein said first power supply comprises a solar panel configured to convert natural light into electrical energy, and wherein said second power supply comprises a battery configured to store energy;
   b) when a determined energy of said first power supply is sufficient, said controller being configured to control said hybrid switcher to operate in a buck converter mode to transfer energy from said first power supply to said second power supply;
   c) when said determined energy of said first power supply is insufficient, said controller being configured to control said hybrid switcher to operate in a DC/DC flyback converter mode to transfer energy from said second power supply to said at least one load; and
   d) an inductive component connected to a first power switch, a second power switch having a parasitic diode that is configured to be used in said buck converter mode, and said second power supply, wherein said second power switch is connected to said common node, and wherein said inductive component and said first and second power switches are shared in both said buck and said DC/DC flyback converter modes of said hybrid switcher.

2. The hybrid driving and controlling circuit of claim 1, wherein said hybrid switcher further comprises a blocking diode that couples said first power supply to said first power switch, said blocking diode having an anode connected to said first power switch.

3. The hybrid driving and controlling circuit of claim 2, wherein said hybrid switcher further comprises:
   a) an output diode coupled in series with said inductive component; and
   b) an output capacitor coupled in parallel with said at least one load,
   c) wherein said output diode and said output capacitor are configured to be used in said DC/DC flyback converter mode.

4. The hybrid driving and controlling circuit of claim 3, wherein said hybrid switcher further comprises a clamp capacitor having a first end connected to said blocking diode and said first power switch, said clamp capacitor having a second end connected to a common negative terminal of said first power supply and said second power supply, said clams capacitor configured to be used in said DC/DC flyback converter mode.

5. The hybrid driving and controlling circuit of claim 1, wherein said first power switch and said second power switch each comprise metal oxide semiconductor field-effect transistors (MOSFET) transistors.

6. The hybrid driving and controlling circuit of claim 3, wherein said inductive component is directly connected to an anode of said output diode.

7. The hybrid driving and controlling circuit of claim 1, wherein:
   a) said buck converter mode comprises a step-down DC to DC conversion from said first power supply to said second power supply; and
   b) said DC/DC flyback converter mode comprises a DC to DC conversion from said second power supply to said at least one load with galvanic isolation by said inductive component.

8. The hybrid driving and controlling circuit of claim 1, wherein said determined energy of said first power supply is sufficient when an output voltage of said first power supply is higher than an output voltage of said second power supply for a predetermined value.

9. A method, comprising:
   a) sensing, by said controller, status information for a first power supply and a second power supply, wherein said status information comprises an indication of energy stored in said first power supply, wherein said first and second power supplies are connected at a common node, wherein said first power supply comprises a solar panel configured to convert natural light into electrical energy, and wherein said second power supply comprises a battery configured to store energy;
   b) controlling, by a hybrid switcher operating in a buck converter mode, said first power supply to transfer energy to said second power supply if said stored energy in said first power supply is determined to be sufficient; and
   c) controlling, by said hybrid switcher operating in a DC/DC flyback converter mode, said second power supply to transfer energy to at least one load if said stored energy in said first power supply is determined to be insufficient, d) wherein a first power switch, a second power switch having a parasitic diode that is configured to be used in said buck converter mode, and an inductive component are shared in both said buck and said DC/DC flyback converter modes of said hybrid switcher, wherein said inductive component is connected to said first and second power switches and said second power supply, and wherein said second power switch is connected to said common node.

10. The method of claim 9, further comprising using a clamp capacitor connected to said first power switch to form an active clamp in said DC/DC flyback converter mode.

11. The method of claim 9, further comprising using an output diode during said DC/DC flyback converter mode, wherein said inductive component is directly connected to an anode of said output diode.

12. The method of claim 9, wherein said determined energy of said first power supply is sufficient when an output voltage of said first power supply is higher than an output voltage of said second power supply for a predetermined value.

13. A double power supply system, comprising:
   a) a first power supply comprising a solar panel configured to convert natural light into electrical energy;
   b) a second power supply comprising a batterylfitirecy,1 to store energy, wherein said first and second power supplies are connected at a common node;
   c) at least one load configured to receive energy from at least one of said first power supply and said second power supply;
   d) a hybrid driving and controlling circuit coupled to said first power supply, said second power supply, and said at least one load, wherein said hybrid driving and controlling circuit comprises a hybrid switcher coupled to a controller;
   e) when energy stored in said first power supply is determined to be sufficient, said controller is configured to control said hybrid switcher to operate in a buck converter mode to transfer energy from said first power supply to said second power supply;

f) when energy stored in said first power supply is determined to be insufficient, said controller is configured to control said hybrid switcher to operate in a DC/DC flyback converter mode to transfer energy from said second power supply to said at least one load; and
g) an inductive component connected to a first power switch, a second power switch having a parasitic diode that is configured to be used in said buck converter mode, and said second power supply, wherein said second power switch is connected to said common node, and wherein said inductive component and said first and second power switches are shared in both said buck and said DC/DC flyback converter modes of said hybrid switcher.

14. The double power supply system of claim 13, further comprising a clamp capacitor connected to said first power switch, wherein said clamp capacitor is configured to be used to form an active clamp in said DC/DC flyback converter mode.

15. The double power supply system of claim 14, further comprising a blocking diode connected to said first power switch and said clamp capacitor, wherein said blocking diode is configured to be used in said buck converter mode.

16. The double power supply system of claim 13, wherein said determined energy of said first power supply is sufficient when an output voltage of said first power supply is higher than an output voltage of said second power supply for a predetermined value.

\* \* \* \* \*